United States Patent [19]

Jennings et al.

[11] 4,057,611
[45] Nov. 8, 1977

[54] PROCESS FOR RECOVERING ALUMINUM FROM ALUNITE

[75] Inventors: Larry D. Jennings, Arvada; Wayne W. Hazen, Wheatridge, both of Colo.

[73] Assignees: Southwire Company, Carrollton, Ga.; National Steel Corporation, Pittsburgh, Pa.; Earth Sciences, Inc., Golden, Colo.

[21] Appl. No.: 801,744

[22] Filed: May 31, 1977

Related U.S. Application Data

[63] Continuation-in-part of Ser. No. 644,128, Dec. 24, 1975, abandoned.

[51] Int. Cl.$^2$ ............................ C01F 7/06; C01F 7/02
[52] U.S. Cl. .................................... 423/127; 423/120; 423/131; 423/339; 423/122; 423/629
[58] Field of Search ............... 423/111, 120, 122, 127, 423/131, 629; 75/97 R, 101 R

[56] References Cited

U.S. PATENT DOCUMENTS

| | | | |
|---|---|---|---|
| 1,070,324 | 8/1913 | Chappell | 423/131 |
| 1,189,254 | 7/1916 | Hershman et al. | 423/120 |
| 1,191,105 | 7/1916 | Hershman | 423/131 |
| 1,195,655 | 8/1916 | Chappell | 423/131 |
| 1,895,580 | 1/1933 | Martin et al. | 423/120 |
| 2,120,840 | 6/1938 | McCullough | 423/127 |
| 2,174,684 | 10/1939 | Cameron | 423/120 |
| 3,652,208 | 3/1972 | Burk et al. | 423/127 |
| 3,868,442 | 2/1975 | Fish | 423/121 |
| 3,890,425 | 6/1975 | Stevens et al. | 423/127 |
| 3,890,426 | 6/1975 | Stevens et al. | 423/127 |

Primary Examiner—Herbert T. Carter
Attorney, Agent, or Firm—Van C. Wilks; Herbert M. Hanegan; Stanley L. Tate

[57] ABSTRACT

An improvement in the process for the recovery of aluminum from alunite in which the alunite in particulate form is dehydrated, sulfur and alkali metal compounds removed from the dehydrated ore leaving a particulate residue containing aluminum values, the residue digested with at least one alkali metal hydroxide to convert the aluminum values to soluble aluminates, silicon removed from the soluble aluminate solution, and aluminum values precipitated from the aluminate solution, the improvement comprising: multiple stage digestion of the particulate residue accomplished by dividing the particulate residue into two fractions, digesting one fraction first and using the first stage liquor from the first digestion step to digest the remaining fraction. The fraction digested first may be the one having the smaller particle size, or the one having the larger particle size. The objective is to contact the caustic digestion liquor at its lowest aluminum content (lowest A/C ratio) with that fraction of the residue having the highest extractable aluminum content. The result is the production of a liquor for final recovery of aluminum values which has a higher aluminum to caustic ratio than that produced by prior digestion procedures. The improvement provides a higher recovery of aluminum from the alunite ore.

8 Claims, 1 Drawing Figure

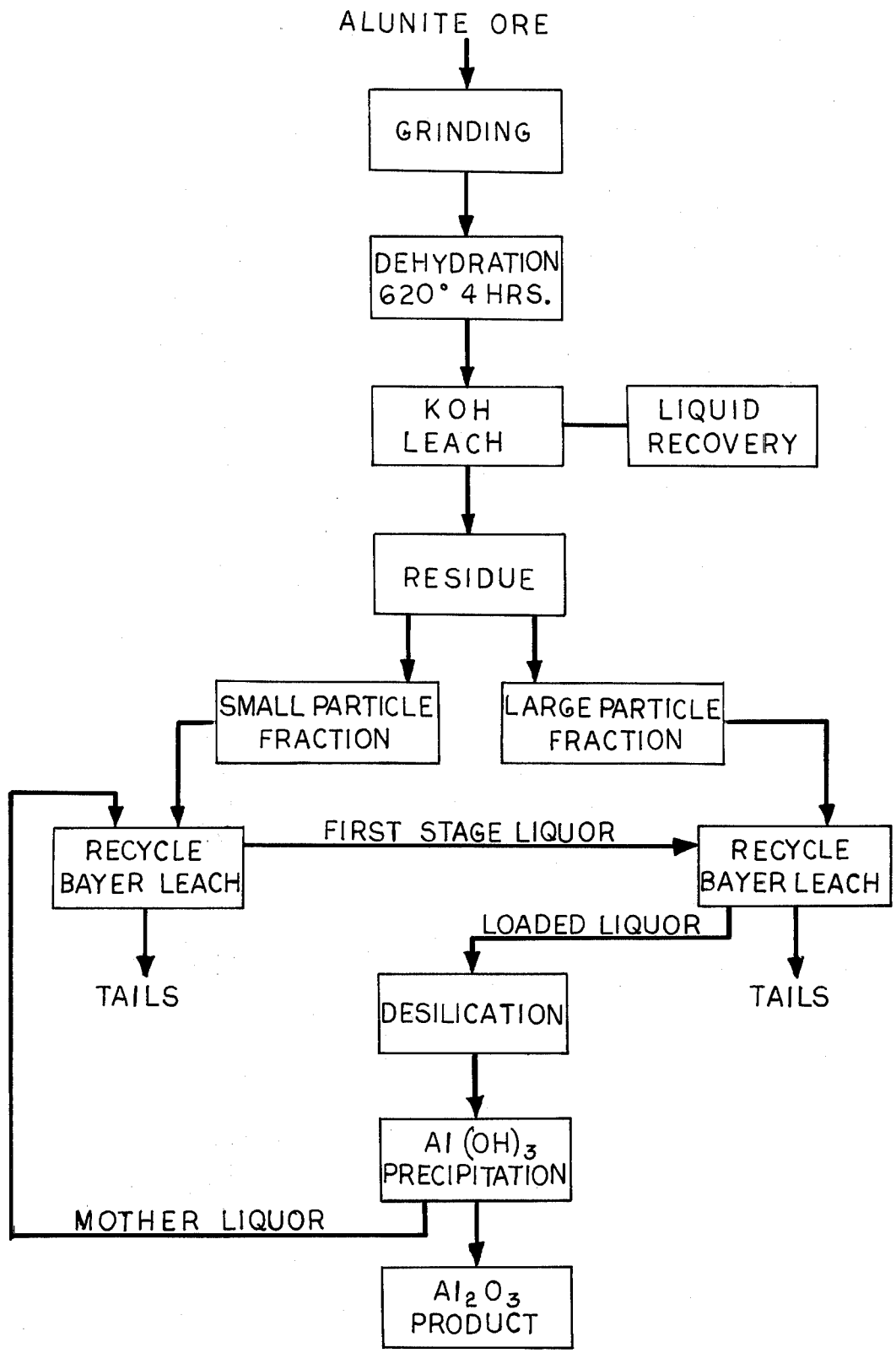

PROCESS FOR RECOVERING ALUMINUM FROM ALUNITE

CROSS-REFERENCES TO RELATED APPLICATIONS

This application is a continuation-in-part application of our application Ser. No. 644,128 filed in the U.S. Patent and Trademark Office on Dec. 24, 1975 and now abandoned.

The present invention is an improvement in the basic processes for recovering aluminum from alunite ore disclosed in U.S. Pat. Nos. 3,890,425 and 3,890,426 assigned to a common assignee with this application. The combined processes of these two patents are referred to hereinafter as the basic process. The disclosures of these two patents are incorporated herein by reference.

BACKGROUND OF THE INVENTION

The invention lies in the field of recovering aluminum from its ores.

The present invention is an improvement in the basic process disclosed in the above-referenced and incorporated patents for recovering aluminum from alunite ore, the basic process broadly comprising dehydrating the particulate ore by roasting, removing sulfur and alkali metal compounds from the roasted ore by one of the alternatives of a reducing roast followed by an oxidizing roast and leaching with solvent, as disclosed in U.S. Pat. No. 3,890,425, or by a direct alkaline leach, as disclosed in U.S. Pat. No. 3,890,426, resulting in a particulate residue containing aluminum values and a solution containing potassium sulfate, which may optionally be recovered, digesting the residue with alkaline solution to convert the aluminum values to soluble aluminate, removing silicon from the aluminate solution, and precipitating the aluminum values as aluminum hydroxide from which alumina is recovered. The expression "roasting and leaching to remove water and compounds of sulfur and alkali metals" as used herein includes the above alternatives.

The invention is an improvement in the above process in which the particulate residue from the leaching step is digested in the Bayer leach in multiple stages by separating it into two fractions, digesting one fraction first with at least one alkali metal hydroxide to a point below saturation of the digestion liquor to convert aluminum values in the fraction to soluble aluminates, and then digesting the second fraction with the liquor resulting from the first digestion step. Preferably, the fraction having the highest extractable aluminum content is digested first. In the preferred embodiment of the invention, one fraction is made up of relatively large particles and the other fraction is comprised of relatively small particles. In this situation, the smaller particle size fraction usually has the higher aluminum content and would ordinarily be digested first although the larger particle size fraction may be digested first.

The processes for recovering aluminum from its ore are highly competitive, and it is important that a competitive process include refinements leading to the highest possible recovery of aluminum. This is particularly true of processes for the recovery of aluminum from low grade ores like alunite, which processes are in competition with those for the recovery of aluminum from bauxite.

While the basic process referred to is highly effective for recovering aluminum from alunite ores, it is, or course, subject to improvement. In the digestion step of the basic process, it is advantageous for maximum percentage recovery of aluminum that the liquor of soluble aluminates resulting from the digestion procedure have a high aluminum to caustic (A/C) ratio. If the solids content of the digestion liquor is increased during digestion of the particulate residue to the point to provide enough aluminate to give a high (A/C) ratio in a single digestion step, a maximum extraction of aluminum is not achieved because aluminum extraction efficiency decreases as the solids content in the alkali metal digestion liquor increases beyond a certain point. Aluminum extraction is apparently improved by lowering the percent solids up to the point of maximum aluminum extraction efficiency.

Accordingly, it is an object of this invention to provide an improvement in the Bayer digestion step of the basic process resulting in the liquor from the digestion step having a high A/C ratio and low solids content, and resulting in a higher percentage recovery of aluminum during the subsequent precipitation step of precipitating aluminum hydroxide from the digestion liquor.

SUMMARY OF THE INVENTION

The invention is an improvement in the Bayer digestion step of the basic process comprising dividing a lot of the particulate residue from the leaching step into two fractions having different particle sizes, digesting one fraction first with caustic to a point below saturation to convert aluminum values to soluble aluminates, and then digesting the remaining fraction with the liquor from the first digestion step. Preferably, the fraction which has the higher aluminum content is digested first. The fraction digested first may be the one having the smaller average particle size or the one having the larger particle size, or the one having the highest extractable aluminum content, or the one having the more readily extractable aluminum content. One objective is to contact the caustic digestion liquor at its lowest aluminum content (lowest A/C ratio) with that fraction of the residue having the highest extractable aluminum content. The result is the production of a liquor for final recovery of aluminum values which has a higher aluminum to caustic ratio than that produced by prior digestion procedures and a lower solids content. The improvement provides a higher overall recovery of aluminum from the alunite ore.

Ordinarily, a lot of the particulate residue is divided into a small particle fraction and a large particle fraction, and the small particle fraction is leached first as it usually contains a higher percentage of aluminum as it has a larger total surface area. The reverse can be true, i.e., the large particle fraction may be digested first, if conditions have occurred in the processing steps preceding the digestion step, for example, which result in a reduced aluminum percentage in the small particles.

BRIEF DESCRIPTION OF THE DRAWING

The drawing is a flow sheet of the basic process incorporating the improved digestion procedure of the present invention.

BRIEF DESCRIPTION OF THE PREFERRED EMBODIMENTS

In the description and the drawing the term "Bayer leach" refers to the digestion liquor resulting from the digestion of the residue from the leaching procedure with alkali metal hydroxide.

Referring to the drawing, it will be noted that raw alunite ore is ground to particulate form before processing. The ore was ground to a particle size of −20 mesh although the mesh size for the largest particles after grinding may be −48 mesh. Dehydration of the ore is accomplished by roasting, as described in the basic process disclosed in the above-referenced patents. The dehydration step is followed by a potassium hydroxide leaching step or a water leaching step to remove sulfur and alkali metal compounds. Alternatively, as stated above, a reduction roast followed by an oxidation roast may be introduced before leaching with the solvent which is water or an alkaline solvent. Ammonium hydroxide or another alkali metal hydroxide may be used instead of potassium hydroxide for the leach. The liquid is separated from the residue by filtering or other means, and the residue sent to the digestion step.

The maximum particle size of the lot to be digested in the Bayer leach by the process of the invention is −20M, the "M" indicating Tyler mesh. This is interpreted to mean that the largest particle size of the lot is the largest particle which passes through a 20M screen. Obviously the lot before grinding contained particles larger than −20M. The range of particle sizes within which the division point between the larger size particle lot and the smaller size particle lot lies is between −20M to −100M, the latter meaning the largest particle size that passes through a 100M screen. The smaller particle size is, of course, that which passes through the screen at any dividing point.

In the illustrative modification a 100M screen was used to separate the −20M lot into larger and smaller size lots to be digested. This means that the size of particles in the +100M lot varies from +100M to −20M and the particles of the smaller size lot are −100M, i.e., all particles passing through a 100M screen. The +100M particles are those passing through a 20M screen but not through a 100M screen.

In the flow sheet, the small particle fraction is digested first and the primary filtrate containing dissolved aluminum values goes to the digestion of the larger particle fraction. The final loaded liquor having a high A/C ratio is then sent to desilication, as in the basic process, following which the aluminum values are precipitated from the liquor as aluminum hydroxide from which the aluminum oxide product is recovered.

The following comparative test examples are illustrative of the invention but not limiting thereof.

Raw alunite ore was oven dried overnight, stage crushed to −20 mesh, dehydrated in a muffled furnace at 620° C for four hours, then leached with potassium hydroxide at a pH 10. The resulting Bayer feed or particulate residue was divided, 25% into a head sample for comparison digests and the remainder separated into +100 mesh and −100 mesh fractions for digestion with sodium hydroxide. In actual operation, of course, the head sample would not be necessary. All leaches were conducted for 20 minutes at 95° C, plus or minus five degrees. The first leach must not be prolonged until the digestion liquor is saturated, an operative and preferred concentration range being an A/C ratio of about 0.4 to about 0.5. Liquid-solids separation is preferably accomplished by conventional thickener techniques.

EXAMPLE 1

38.3 g of Bayer feed, containing all mesh sizes, was leached at 17.5% solids in 150 ml synthetic recycle liquor (0.32A/C).

EXAMPLE 2

21.0 g of +100 mesh Bayer feed was leached in 180 ml of synthetic recycle liquor at 8.8% solids and the resulting slurry filtered. Then 13.9 g of −100 mesh Bayer feed was leached at 8.8% solids in 120 ml of primary liquor from the +100 mesh leach.

EXAMPLE 3

17.9 g of −100 mesh Bayer feed was leached in 180 ml of synthetic recycle liquor (7.7% solids). Then 19.0 g of +100 mesh Bayer feed was leached in 130 ml of primary liquor from −100 mesh leach (11% solids).

EXAMPLE 4

45.0 g of Bayer feed from the head sample, containing all mesh sizes, was leached in 150 ml of synthetic recycle liquor at 20% solids.

The results of the four tests are recorded in the table below. The A/C ratio for each of the digestion steps was calculated. This included the ratio for the single digestion steps of tests 1 and 4 and the ratio for each of the steps A and B of tests 2 and 3. The A/C ratio of tests 1 and 4 and step B of tests 2 and 3 is, of course, the ratio of the Bayer digestion liquor sent to aluminum recovery. The percentage of aluminum recovered from the residue sample in each of the tests was determined by analysis. All of the results along with the solids content of the digestion liquors are reported in the following table.

| | Test 1 HEAD | Test 2 | | | Test 3 | | | Test 4 HEAD |
|---|---|---|---|---|---|---|---|---|
| | | A +100 Mesh | B −100 Mesh | Total (A&B) | A −100 Mesh | B +100 Mesh | Total (A&B) | |
| % Al. Extr. | 91.4 | 96.2 | 90.1 | 93.3 | 96.4 | 93.8 | 95.2 | 83.5 |
| A/C of each Slurry | (.57) | .44 | .58 | | .45 | .59 | | .61 |
| Calculated %Al extr. after desilication | 87.7 | | | 89.0 | | | 91.2 | 79.8 |
| % solids | 17.5 | 8.8 | 8.8 | | 7.7 | 11 | | 20 |

Tests 2 and 3 consist of two steps, A and B, performed in that order, with the digestion liquor for step B being that resulting from the digestion of step A in each case. The "synthetic recycle liquor" referred to, which has an A/C of 0.32, is referred to in the flow diagram as mother liquor and is recycled from the aluminum hydroxide precipitation step to the Bayer digestion.

It will be noted from the results in the table that the higher aluminum recovery was obtained in tests 2 and 3, performed in accordance with the invention, than in tests 1 and 4 on the head sample containing all mesh sizes. It is also observed that an A/C ratio in tests 2 and 3 substantially as high was that used in tests 1 and 4 was used with an increased recovery of aluminum. The test results further show that no more aluminum was lost in the desilication of the liquor resulting from tests 2 and 3 than was lost from the liquor resulting from tests 1 and 4, thus indicating that no more silicon is carried over in the final liquor from the digestion procedure of this invention than was carried over in the conventional digestion procedure. Further, the results show that an A/C ratio substantially as high as that for tests 1 and 4 was achieved in tests 2 and 3 with about 50% less solids content of the slurry. The high solids content of the slurries of tests 1 and 4 necessary to obtain the high A/C content resulted in the reduced recovery of aluminum.

As previously stated, it was found that the solids content of the digestion liquor must be maintained below a certain point for maximum recovery of aluminum. By leaching the higher aluminum content fraction first, as in step A, a relatively high A/C content can be maintained with a low solids content and a higher A/C ratio can be maintained in step B at substantially the same low solids content, due to the aluminum picked up by the digestion liquor in step A. The overall result is that a final liquor is produced for aluminum recovery having a high A/C content and a low solids content. According to the previous procedure, if enough solids content was used to obtain a high A/C radio, the recovery of aluminum was reduced.

The improved digestion step of the invention is readily incorporated into the basic process as the digestion step of that process with improved results being obtained.

We claim:

1. A method for recovering aluminum hydroxide from alunite ore which comprises:
   a. grinding the ore to provide a particulate product having a maximum particle size up to about $-20M$;
   b. dehydrating the particulate alunite ore;
   c. leaching the dehydrated ore with an alkaline solvent or water to remove compounds of sulfur and alkali metals and leave a particulate residue containing aluminum values;
   d. separating the particulate residue into two fractions of smaller and larger size particles, wherein the dividing line between the large size particle fraction and the small size particle fraction is between $-20M$ and $-100M$;
   e. digesting one fraction with at least one alkali metal hydroxide to an aluminum to caustic ratio of the leach liquor of about 0.4 and 0.5 to convert the aluminum values in the fraction to soluble aluminates;
   f. separating the liquids and solids resulting from step (e);
   g. digesting the remaining fraction with the liquor from the separation of step (f) to convert the aluminum values in the fraction into soluble aluminates; and
   h. precipitating aluminum hydroxide from the soluble aluminates.

2. The method of claim 1 in which the small particle size fraction is digested first.

3. The method of claim 1 in which the large particle size fraction is digested first.

4. The method of claim 1 in which the fraction digested first is that fraction having the highest extractable aluminum content.

5. The method of claim 1 in which in step (b) the dehydrated ore is subjected to a reducing roast followed by an oxidation roast and leached with water or an alkali metal hydroxide or ammonium hydroxide to remove sulfur and alkali metal compounds.

6. The method of claim 6 in which silica is precipitated from the liquor containing soluble aluminates from steps (e) and (g), aluminum hydroxide is precipitated from the remaining liquor, aluminum values recovered from the precipitated aluminum hydroxide, and the final liquor from aluminum hydroxide precipitation returned to the digestion step.

7. The method of claim 1 in which in step (b) the dehydrated ore is subjected directly to a leaching step with alkali metal hydroxide or ammonium hydroxide to remove sulfur and alkali metal compounds.

8. The method of claim 8 in which silica is precipitated from the liquor containing soluble aluminates from steps (e) and (g), aluminum hydroxide is precipitated from the remaining liquor, aluminum values recovered from the precipitated aluminum hydroxide, and the final liquor from aluminum hydroxide precipitation returned to the digestion step.

* * * * *